May 25, 1937.　　　L. W. DIAMOND　　　2,081,616
COMPRESSION VALVE
Filed Feb. 10, 1936

INVENTOR.
LEON W. DIAMOND
BY Bates, Golrick, & Teare
ATTORNEYS

Patented May 25, 1937

2,081,616

UNITED STATES PATENT OFFICE 2,081,616

COMPRESSION VALVE

Leon W. Diamond, Shaker Heights, Ohio, assignor to John E. Bernstein, Cleveland, Ohio Application February 10, 1936, Serial No. 63,055

3 Claims. (Cl. 251—160)

This invention relates to improvements in compression valves and faucets in which the valve ports are closed by a fibre or rubber gasket that is carried by a valve body, which is compressed against the port. Heretofore, the common practice has been to attach such gasket by means of a central screw, which has been threaded onto the bottom of the valve body. Such practice however, is open to several objections, such as the difficulty of removal for replacing the gasket, as the screw frequently becomes set from corrosion. In addition, the screw tends to turn on its thread by the operation of the valve, thus loosening the gasket and allowing it to drop off.

An effort has been made to overcome such objections by mounting a gasket on a metallic washer, from which a stem extends into the opening which normally has been occupied by the shank of the washer screw. I have found, however, that washers of such construction have had a smooth uninterrupted surface which has caused a binding action of sufficient degree when pressure is applied to make the washer turn with the valve body. The constant rotation of the washer against the seat has resulted in premature wear of the washer. I have also found that due to the looseness of the fit between the metallic stem and the hole in the valve body, there is an objectionable rattle whenever the faucet is operated.

An object of my invention is to provide a gasket, which has the advantages of that type, which does not require a screw to hold it against the valve body, but which cannot be rotated when pressure is applied by the rotating valve body. In addition, my invention contemplates a gasket, which can be made in an economical manner, and which will not cause a rattle or other metallic noise whenever the faucet is operated.

Figure 1:
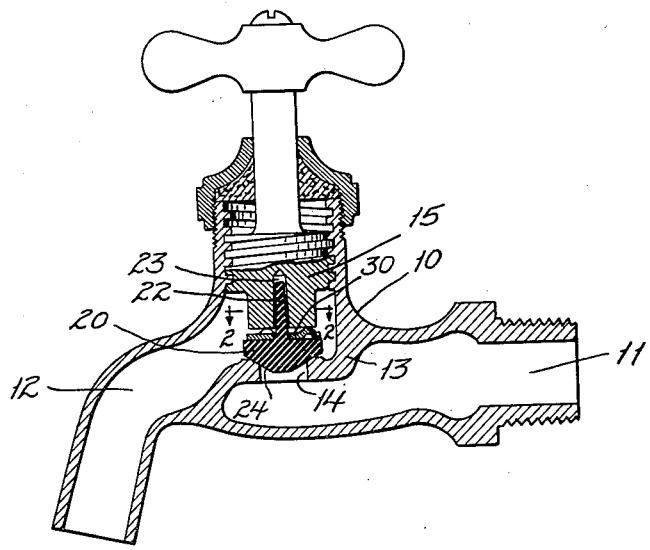
Figure 3:
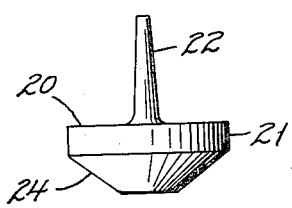
Figure 2:
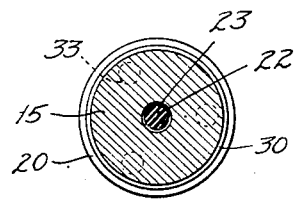
Figure 4:
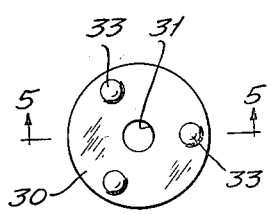
Figure 5:
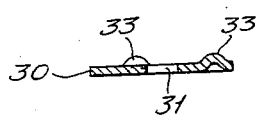

In the accompanying drawing, I have illustrated my invention as applied to an ordinary faucet wherein Fig. 1 shows the faucet in cross section; Fig. 2 is a section taken on an enlarged scale on the line 2—2 in Fig. 1; Fig. 3 is a side elevation of the gasket; Fig. 4 is a top plan view of the bearing plate that is used with the gasket, and Fig. 5 is a section taken on the line 5—5 in Fig. 4.

The faucet, which I have shown has a body 10, that is provided with the usual inlet chamber 11, which is adapted to be directly connected to a supply pipe. The faucet is also shown, as having an outlet chamber 12, which is separated from the inlet chamber by the web 13, which contains the port 14. A valve body 15 is threaded in the usual manner and is disposed above the port so that its lower end will compress the gasket 20 that is disposed between the web and the valve body.

The gasket which I have provided has a head 21 and a shank 22. The shank is adapted to extend into a hole 23 that extends axially of the valve body and upwardly from the bottom thereof. The lower portion of the head 24 comprises a truncated cone, which is adapted to engage the seat and to make a liquid tight joint therewith.

A washer 30 is disposed between the gasket and the valve body and to this end is provided with a central opening 31 through which the gasket shank 22 projects. The washer may have a restricted area of contact with the valve body, such as by a plurality of protuberances 33 thereon which engage the bottom surface of the valve body. Preferably there are three such points of contact, which are formed by striking up the metal of which the washer is made. The bearing surfaces illustrated are three in number, and are arranged at the apexes of an equilateral triangle, the distance from each apex to the axis of the washer being substantially the same. In other words, each apex is on a circle, the axis of which is coincident with the axis of the washer.

I have found that a combination of gasket and washer, such as I have illustrated enables the valve body to be tightened as much as possible without causing any rotation of the gasket. I have also found that the gasket and washer can be economically made, and that they may be assembled, as a unit in an expeditious and economical manner.

I claim:—

1. An article of manufacture, comprising a faucet gasket, having a head, a stem formed integrally with the head and projecting centrally from one end thereof and a washer having a central opening through which the stem projects, the washer having relatively raised and depressed portions which reduce the effective bearing surface against which a valve body may engage.

2. A faucet disk, comprising a gasket having a head, a shank integral with the head, and a washer having an opening through which the head projects, the washer having a plurality of spaced protuberances that are disposed substantially the same radial distance from the axis of the gasket and that project away from the head of the gasket.

3. In combination, a faucet gasket, comprising a head and a stem integral therewith, a washer having a central opening through which the stem projects, the washer having three protuberances projecting above the upper surface thereof and arranged at the apexes of an equilateral triangle and each protuberance being disposed substantially the same distance from the axis of the washer.

LEON W. DIAMOND.